(12) United States Patent
Lübker et al.

(10) Patent No.: US 12,066,011 B2
(45) Date of Patent: Aug. 20, 2024

(54) WAKE MONITORING, WAKE MANAGEMENT AND SENSORY ARRANGEMENTS TO SUCH

(71) Applicant: Ventus Engineering GmbH, Vienna (AT)

(72) Inventors: Poul Anker Skaarup Lübker, Baar (CH); Shavkat Mingaliev, Vienna (AT); Patricia Tencaliec, Vienna (AT); Xavier Tolron, Vienna (AT); Khalfaoui Beyrem, Vienna (AT)

(73) Assignee: Ventus Engineering GmbH, Vienna (AT)

( * ) Notice: Subject to any disclaimer, the term of this patent is extended or adjusted under 35 U.S.C. 154(b) by 0 days.

(21) Appl. No.: 17/797,104

(22) PCT Filed: Feb. 3, 2021

(86) PCT No.: PCT/EP2021/052507
§ 371 (c)(1),
(2) Date: Aug. 2, 2022

(87) PCT Pub. No.: WO2021/156287
PCT Pub. Date: Aug. 12, 2021

(65) Prior Publication Data
US 2023/0340940 A1   Oct. 26, 2023

(30) Foreign Application Priority Data
Feb. 3, 2020   (EP) .................................... 20155236

(51) Int. Cl.
*F03D 7/04* (2006.01)

(52) U.S. Cl.
CPC ........ *F03D 7/048* (2013.01); *F05B 2270/204* (2020.08); *F05B 2270/334* (2013.01); *F05B 2270/8042* (2013.01); *F05B 2270/807* (2013.01)

(58) Field of Classification Search
CPC ................ F03D 7/048; F05B 2270/204; F05B 2270/334; F05B 2270/8042; F05B 2270/807; Y02E 10/72
See application file for complete search history.

(56) References Cited

U.S. PATENT DOCUMENTS 7,822,560 B2 * 10/2010 LeMieux ................ F03D 7/042
                                                            324/207.16
9,194,843 B2 * 11/2015 Newman ................ G01N 29/22
(Continued)

FOREIGN PATENT DOCUMENTS

| EP | 2696067 A2 | 2/2014 |
| EP | 2757255 A1 | 7/2014 |

(Continued)

OTHER PUBLICATIONS

Trabucchi Davide et al: "Nacelle-based Lidar Measurements for the Calibration of a Wake Model at Different Offshore Operating Conditions", Energy Procedia, Elsevier, NL, vol. 137, Dec. 15, 2017, pp. 77-88, XP085309475, ISSN: 1876-6102, DOI: 10.1016/J.EGYPRO.2017.10.335.

(Continued)

*Primary Examiner* — Pedro J Cuevas
(74) *Attorney, Agent, or Firm* — Dykema Gossett PLLC

(57) ABSTRACT

Disclosed is a method of establishing a wake management of a wind farm. The method comprises acts of monitoring one or more wake conditions using one or more sensors from one or more wind turbine generators (WTGs); and establishing a wake management of the wind farm as a function of the wake conditions. Disclosed is also a method of optimising (Continued)

operation of a wind turbine park based on wake management and a system for generating wake management.

17 Claims, 16 Drawing Sheets

(56) References Cited

U.S. PATENT DOCUMENTS

| | | | | |
|---|---|---|---|---|
| 9,644,612 | B2* | 5/2017 | Evans | H02J 3/381 |
| 9,995,278 | B2* | 6/2018 | Lund | F03D 7/042 |
| 10,132,295 | B2* | 11/2018 | Lund | F03D 7/043 |
| 10,260,481 | B2* | 4/2019 | Wilson | F03D 7/0224 |
| 10,815,972 | B2* | 10/2020 | Evans | F03D 17/00 |
| 10,954,919 | B1* | 3/2021 | Evans | G06Q 50/06 |
| 11,242,842 | B2* | 2/2022 | Kaucic | F03D 7/048 |
| 11,499,532 | B2* | 11/2022 | Herrig | F03D 13/10 |
| 11,639,710 | B2* | 5/2023 | Post | F03D 17/00 290/44 |
| 11,649,804 | B2* | 5/2023 | Shartzer | F03D 17/00 290/44 |
| 2006/0140761 | A1* | 6/2006 | LeMieux | F03D 7/042 416/61 |
| 2009/0319199 | A1 | 12/2009 | Volkmer | |
| 2014/0260634 | A1* | 9/2014 | Newman | G01N 29/22 73/645 |
| 2016/0084224 | A1* | 3/2016 | Tyber | F03D 17/00 700/287 |
| 2016/0084233 | A1* | 3/2016 | Evans | F03D 7/048 73/112.01 |
| 2016/0333854 | A1* | 11/2016 | Lund | F03D 7/042 |
| 2016/0333855 | A1* | 11/2016 | Lund | G05B 13/041 |
| 2017/0016430 | A1* | 1/2017 | Swaminathan | G06Q 50/06 |
| 2017/0370348 | A1* | 12/2017 | Wilson | F03D 7/0224 |
| 2019/0203696 | A1* | 7/2019 | Kaucic | F03D 7/046 |
| 2019/0226457 | A1* | 7/2019 | Bertolotti | F03D 17/00 |
| 2020/0300227 | A1* | 9/2020 | Evans | F03D 17/00 |
| 2021/0033075 | A1* | 2/2021 | Herrig | F03D 13/10 |
| 2021/0232109 | A1* | 7/2021 | Chakrabarti | F03D 17/00 |
| 2021/0246875 | A1* | 8/2021 | Fu | F03D 7/042 |
| 2022/0010769 | A1* | 1/2022 | Post | G01S 19/53 |
| 2022/0128030 | A1* | 4/2022 | Chandrasekhar | F03D 7/0276 |
| 2022/0145854 | A1* | 5/2022 | Lübker | F03D 7/0224 |
| 2022/0412313 | A1* | 12/2022 | Post | F03D 17/00 |
| 2023/0272775 | A1* | 8/2023 | Post | F03D 7/048 290/44 |

FOREIGN PATENT DOCUMENTS

| | | |
|---|---|---|
| EP | 3517774 A1 | 7/2019 |
| WO | 2018007012 A1 | 1/2018 |

OTHER PUBLICATIONS

P.M.O. Gebraad et al: "Wind turbine wake estimation and control using FLORIDyn, a control-oriented dynamic wind plant model", 2015 American Control Conference (ACC), Jul. 1, 2015, pp. 1702-1708, XP055413503, DOI: 10.1109/ACC.2015.7170978; ISBN: 978-1-4799-8684-2.

* cited by examiner

A:

B:

[ 1.01918290e+00  2.04925322e-01  -1.45353621e+00  1.03958077e+00
  1.26328452e+00  2.07932100e+03  -1.66502794e-01  1.66775244e-01
  7.11376951e-01  6.09204975e-01]

C:

Metric 1   Metric 2                                    Metric x

WAKE MONITORING, WAKE MANAGEMENT AND SENSORY ARRANGEMENTS TO SUCH

CROSS-REFERENCE TO RELATED APPLICATIONS

This application is a national stage filing based upon International PCT application no. PCT/EP2021/052507, filed 3 Feb. 2021, which claims the benefit of priority to Europe application no. 20155236.1, filed 3 Feb. 2020.

BACKGROUND OF THE INVENTION

Field of the Invention

The present invention relates to a method of establishing a wake management of a wind farm. The method comprises acts of monitoring one or more wake conditions using one or more sensors from one or more wind turbine generators (WTGs); and establishing a wake management of the wind farm as a function of the wake conditions. Disclosed is also a method of optimising operation of a wind turbine park based on wake management and a system for generating wake management.

Description of Prior Art

Wake and turbulence in the wind are well-known reasons why Wind Turbine Generators (WTG) are underperforming. The quality of the wind which is harvested is critical for the power production of a wind turbine generator. Therefore, in a wind farm, every wind turbine generator located downstream from one or more turbines, or other objects disturbing the wind flow, is directly exposed to the wake of these other turbines and objects upstream resulting in lower wind speed and higher turbulence. The impact in terms of production loss is highly significant: it is commonly known that the wake losses can reduce the annual production of a wind farm.

A person skilled in the art will appreciate a multitude of definitions of wake conditions. Generally, a wake emerges when a wind turbine generator is in operation. The wake and operation both depend on and alter aerodynamic conditions around the wind turbine. As such the wake influences the level of turbulence, the production, etc.

EP2696067A2 discloses a method and system for optimising operation of a wind farm where wake conditions are monitored using vibration sensors, power meters or LIDAR, arranged on the nacelle or wind turbine. The sensor data is transmitted to a central wind farm controller. The wind fluctuations or the power fluctuations and vibration levels can be used to indicate the wake conditions. The wake correction is triggered when the turbulence intensity or wind deficit exceeds a threshold. The control system uses a wind estimator and a load/power estimator to estimate the wind conditions, power production and loads, which are inputted to an evaluation module using clustering and e.g. a wake model to determine the optimal yaw angles.

EP3517774A1 discloses a method and system for optimising the operation of the wind farm and implicitly establishing a wake management, The wake conditions are monitored using sensors measuring e.g. power output, generator speed and nacelle acceleration, where a turbulence level is estimated from the nacelle acceleration. The sensor data received from at least two wind turbines is synchronised in time and stored in a database. A machine learning, e.g. a Gaussian process or neural network, is used to train the data driven model, e.g. a regression model based on historical and current sensor data. Power production of the upstream wind turbine is inputted to the data driven model and it returns a prediction value which is used to control the wind turbines.

SUMMARY OF THE INVENTION

Description

An objective is achieved by a method of establishing a wake management of a wind farm. The method comprising acts of as follows.

There is an act of monitoring one or more wake conditions using one or more sensors from one or more wind turbine generators (WTGs).

Monitoring may be based sensory data from one or more sensors arranged as vibration sensors placed in one or more of the blades (22) of a rotor of the wind turbine.

There may be acts of identifying the respective one or more wake conditions by an act of processing the sensory data.

There is an act of establishing a wake management of the wind farm as a function of the wake conditions.

Thereby the energy loss due to wakes is reduced since the collective power output of the wind farm will prevail over the individual power output of a single wind turbine.

This wake management system will decide, control and enable each individual WTG to operate, e.g. yaw differently for the overall wind farm output to be optimal.

This decision making will be depending on the amount of wake/turbulence every individual wind turbine generator is experiencing. The wake optimization will orientate the downstream of each individual turbine in an optimal way for the entire wind farm, i.e., the wind turbines upstream having as less impact as possible on the following turbines downstream.

Thus, once the wind farm management optimization is applied, the individual turbines will not be in an individual optimal condition state, but the overall wind farm will produce significantly more due to the increased quality of the wind. This wake management leads to a significant production increase for the overall wind farm.

Prior art relies on technology and diagnostics to be placed external to a wind turbine. Either completely separated from a wind turbine or installations such as nacelle-based anemometers/SCADA or LiDAR technology.

Contrary to the existing wake management, the disclosed wake management system relies on or includes rotor and/or blade status or conditions in the wake management.

All, and optionally time stamped and time synchronized, data of vibrations, yaw direction measurement, buffer zone in front of the rotor measurement, rainfall and hail measurements, power output measurement, etc., from at least two, more or all the wind turbines in the wind farm are considered and used to adjust at least one of the following nacelle yaw directions, and/or blade pitches, and/or rotor RPMs to achieve the best global power output for the whole wind farm.

In an aspect, the act of monitoring is performed by identifying the respective one or more wake conditions by an act of processing sensory data provided from the respective one or more wind turbine generators (WTGs).

Time stamping of data and time synchronization of the collected data may improve the quality of the data. Furthermore, one higher quality sensor may be used to improve lower quality sensor data.

As exemplified, machine learning may be used in processing the sensory data to identifying wake conditions.

In an aspect, the act of processing sensory data involves identifying aerodynamic conditions as wake conditions in the sensory data.

For example, turbulence conditions may be defined by a turbulence intensity threshold. Aerodynamic conditions may also be rain or hail conditions.

Processing, e.g. extracting, identifying conditions may also be mapping aerodynamic conditions gradually. As an example, laminar conditions may be considered below the intensity threshold and the turbulence conditions may be above the threshold or the turbulences condition may be mapped gradually.

Processing or extracting wake and turbulence of the wind for each turbine of a wind farm may be implemented using e.g. computer implemented software. Such software may include Computational Fluid Dynamics (CFD) used for simulations of wake in a wind farm. For an entire wind farm a central computer hosting the wake management system and wake model and a central database where all data are collected; and optionally synchronized.

One or more wind turbines interact directly with one or more wind turbines in their surroundings in order to have a local optimization rather than a global one. These local optimizations would eventually result, after some iteration, into a global one.

The processing may be dynamic wake management. The processing may also be triggered wake management, when the turbulence intensity for an individual turbine or for a set of turbines is higher than a certain acceptable, predefined threshold. A set of acceptable, predefined thresholds can be adjusted individually for each wind farm in collaboration with the owner who normally will consider the optimization of wind farm production and lifetime together. This threshold will be defined considering that individual WTG loads could be affected during the operation with induced nacelle yaw misalignment and/or blade pitch and/or rotor RPM.

Processing may be of at least two wind turbine generators in the wind farm being monitored, but optionally all the wind turbines in the wind farm will be monitored. In some cases only a set of wind turbines may be monitored.

In an aspect, the act of monitoring is based on rotor sensory data or sensory input.

In each individual wind turbine there may be sensors generating sensory data. There may be accelerometers or another device detecting vibration in one, more or all blades. The rotor sensory data may alternatively or optionally be obtained by generator power output measurement.

Sensory data may further be based on acoustic sensory data from an acoustic sensor.

The data from vibration, e.g. acceleration, sensor(s): One or multiple vibration sensors located inside one or several blades and may be configured to continuously transmit the data wirelessly to a collection box. The data may be time-stamped.

As such parts of analysis and processing or pre-processing may be performed in a sensor node located in e.g. a blade.

The data covers all the data collected from installation time and its size and frequency is a parameter that can be either fixed or changing depending on the condition signature and/or an event-trigger indicated by the same data.

Acceleration is measured through these vibrations, e.g. acceleration, sensor(s) on one, two, three axes; or generally in a multi-axial setup.

Final data of timestamps and corresponding acceleration values can be aggregated with other sensors or turbine state data and is presented to the algorithm for a specified moving time window that may change depending on the condition to be looked at.

In an aspect, the act of measuring is based on timestamped and synchronized sensory data. That is that one sensor input is synchronized with another sensor input. In an aspect, there may be one higher resolution sensory input and one or more, lower resolution sensory inputs.

In an aspect, the act of identifying is performed locally in connection with measuring sensory input.

A vibration sensor may be arranged in a sensor node. A sensor node may be configured with a communication link configured to transfer data to a central processor. Some or all data may also be processed directly in the sensor node A sensor node may be configured with a processor to perform identification as outlined. A sensor node may be configured with means for updating signatures. A sensor node may be configured with means to pre-process or even process sensory input. This allows a sensor node to operate using as little power consumption as possible. As such, it may be advantageous to provide a processor at a sensor node with the extra efforts as compared to having the sensor node transmit data (high sampling rate) to a processor placed elsewhere. Thereby mitigating adverse power consuming effects related to wireless transmission data.

A sensor node may further be provided with means to adjust sampling rate/frequency of the sensor. The sampling may be adjusted dynamically, according to the condition and the signature. A sensor node may operate at low power consumption with a low resolution, and if a signature is expected or otherwise indicated, the sensor node may adjust sampling and processing to increase resolution in attempt to determine if a signature of an abnormal condition is present more decisively.

A sensor node may also operate with a moving window in the sense that normal data will be deleted and not wirelessly transferred for further processing or alternatively only normalised data will be transferred for further processing. Algorithms in the sensor node may vibrations e.g. turbulence intensity data and then potentially trigger a shift in sampling frequency and storage of data a certain time before and after the trigger event and kept for further detailed processing. The time window may be predefined or changed according to the actual situation.

Further data may be included. There may be a wind direction and nacelle yaw direction measurement. The data may be time stamped or synchronized. There may be a data collecting unit collecting the timestamped data to be processed.

Optionally, a further at least one LiDAR and GPS coordinate of all turbines may be used for establishing a wake map. A person skilled in the art may find it useful to have the yearly wind rose and yearly wind distribution.

In an aspect, the act of monitoring is performed based on one or more vibrations, e.g. acceleration, sensors placed in or one or more of the blades of the rotor. Such sensor may be as outlined.

The sensor data may be processed using feature extraction indicative of turbulence, turbulence intensity and thus establish a measure of wake.

In an aspect, the act of processing is based on rotary sensory data provided by high frequency sampling.

One sensor may be sampling at high frequency and thus be used to improve the accuracy of other sensory inputs obtained at lower sampling frequencies. In an aspect, the act of processing is based on timestamped and synchronized sensory data. As such, accuracy may be improved.

In one example, one vibration sensor node in a blade may be a high frequency sampling sensor.

In one example, power output may be oversampled/fast sampled, i.e. high-frequency sampled at a high frequency to quantify rotational speed or power output. Such sampling may be of sensors such as Rogowski coils.

In an aspect, the act of monitoring is performed further using a temporally installed and actual wake condition monitoring, optionally obtained by LiDAR measurements. There may be an act of processing that is performed by further calibrating processed sensory data against the temporally actual wake conditions.

In one example, there may be several approaches to the wake management system on a wind farm based on acts as outlined.

Optionally all data is timestamped and time-synchronized data. Data is collected as vibrations, e.g. accelerations, from sensors in the blades, data is collected as yaw direction measurement, power output measurement from at least two wind turbine generators, and even from all the wind turbines in the wind farm. Data is processed as outlined, considered and used to adjust at least one of the following: nacelle yaw direction and/or, blade pitch, and/or, rotor RPM to achieve the best global power output for the whole wind farm.

Buffer zone in front of the rotor can be estimated by algorithms based on data collected from the vibration and acceleration sensors located in the blades. Achieving symmetry of the buffer zone in front of the rotor may thus be achieved to improve energy capture.

One or more wind turbines interact directly with one or more wind turbines in their surroundings in order to have a local optimization rather than a global one. These local optimizations would eventually result, after some iteration, into a global one.

The wake monitoring or management may be dynamic wake management. That is the wake management is triggered when the turbulence intensity for an individual turbine or for a set of turbines is higher than a certain acceptable, predefined threshold. A set of acceptable, predefined thresholds can be adjusted individually for each wind farm in collaboration with the owner who normally will consider the optimization of wind farm production and lifetime together. This threshold will be defined considering that individual WTG loads could be affected during the operation with induced nacelle yaw misalignment and/or blade pitch and/or rotor RPM.

At least two wind turbine generators in the wind farm will be monitored, but all the wind turbines in the wind farm may be monitored.

In cases maybe only a set of turbines will be monitored, e.g. non-consecutive wind turbines, may be monitored.

As such an object may be achieved by a method of optimizing operation of a wind farm with multiple wind turbine generators (WTGs). The method of optimizing may comprise the following acts:

There is an act of monitoring, using one or more sensors, one or more wake conditions from one or more wind turbine generators (WTGs).

There is an act of establishing a wake management of the wind farm as a function of the wake conditions.

There is an act of determining individual wind turbine generator (WTG) control settings as an optimized power production function of the wake management and individual wind turbine generator (WTG) parameters.

There is an act of operating one or more wind turbine generators (WTGs) in the wind farm based on the individual wind turbine generator (WTG) control setting.

In an aspect, the act of monitoring the wake is performed as disclosed. The act of determining individual wind turbine generator (WTG) control settings may be performed by minimizing the total wake in the wake management as a function of the wake conditions.

That is to minimize the total turbulence.

In an aspect, the act of operating one or more wind turbine generators (WTGs) involves an act of pitching, yawing, regulating rotational speed, or combinations thereof.

An object may be achieved by a system as will be described. The system or parts of the system may be used to perform acts as disclosed. The system may be configured for generating a wake management. The system may comprise one or more sensors arranged on respective one or more wind turbine generators.

There may be means adapted to execute the acts of the method as outlined.

There may be a controller system configured for optimizing operation of a wind farm with multiple wind turbine generators (WTGs). The controller system may comprise sensory input from one or more sensors and means, inclusive computational means, say a computer, adapted to execute the acts of the method as outlined.

The controller system may comprise one or more sensors that may be vibration, e.g. acceleration, sensors configured to be placed in one or more blades of a wind turbine generator (WTG) and configured to measure rotor blade vibrations/acceleration indicative of turbulence.

Such sensors and arrangements will be exemplified later.

The system and controller system disclosed may comprise instruments needed for development of a wake management system. There may be computer-implemented aspects.

For example to monitor wake and turbulence of the wind for each turbine of a wind farm, the following may be applied:

There may be a setup of Computational Fluid Dynamics (CFD) for simulations of wake in a wind farm.

Individual wind turbine generators may have sensors in the form of a) Accelerometers or another device detecting vibration in all blades, b) generator power output measurement and c) nacelle yaw direction measurement, and/or d) collection box for collecting the time stamped data to be processed.

For an entire wind farm there may be a central computer hosting the wake management system and wake model and the central database where all data are collected and synchronized.

Furthermore, there may be a LiDAR system and GPS coordinates of all turbines to establish the wake map. It may be useful to have the yearly wind rose and yearly wind distribution and include such information into the wake management.

Turbulence intensity threshold may be defined or set to acceptable wind conditions.

Instrumentation and parameters for final wake management system and computer implemented model configuration may include, in each individual wind turbine generator: a) Accelerometers or another device detecting vibration may be in one or all blades, b) generator power output measurement, c) nacelle yaw direction measurement, and d) collection box for collecting the timestamped data to be processed. For an entire wind farm there may be GPS coordinates of all turbines. There may be a communication system between a centralized unit and the target wind turbines. The centralized unit may be configured for receiving data, processing data, sending out instructions/decision making to controllers of all turbines.

The operation may involve an autonomous, centralized unit collecting and real time processing of optionally time-stamped and time-synchronized data collected from at least two wind turbine generators and possibly from all the wind turbines of the wind farm that forms the basis of the decision making if wake management is needed. If so, then operationally there is issued an instruct or control setting: a) a new nacelle yaw direction, and/or b) a new blade pitch setting, and/or c) a rotor RPM for all target wind turbine generators.

Optionally there may be, for the entire wind farm, a LiDAR system temporarily installed, e.g. initially to get turbulence calculations or to enable identification of operational conditions more reliable and/or quicker. The vibration data from sensors in the blades may be calibrated or adjusted against LiDAR measures; and/or rain or hail measures.

An outcome of the wake management decision making on the individual target wind turbines may include a corrected set of individual clockwise or counter-clockwise nacelle yaw offset value on wind turbines, a corrected set of individual blade pitching values, or a corrected set of reducing/increase rotational speed of the rotor.

As such there may be a wind farm comprising a system as disclosed for establishing the wake management; a controller system as disclosed and configured for controlling individual, and more or all wind turbine generators (WTGs) as disclosed.

There may be a computer program product comprising instructions to cause the system as disclosed to execute the acts of the method disclosed. There may be a computer-readable medium having stored thereon the computer program.

BRIEF DESCRIPTION OF DRAWINGS

Embodiments of the invention will be described in the figures, whereon.

DETAILED DESCRIPTION OF THE INVENTION

| | |
|---|---|
| Rotary device | 10 |
| Wind Turbine Generator (WTG) | 12 |
| Tower | 13 |
| Rotor | 14 |
| Rotor sector | 18 |
| Nacelle | 19 |
| Set of rotor blades | 20 |
| Rotor blade/blade | 22 |
| Generator | 28 |
| Dataset | 30 |
| Data | 31 |
| Timestamped data | 32 |
| Timestamp | 34 |
| Set of blade sensors | 40 |
| Sensor means | 41 |
| Blade sensor | 42 |
| Sensor node | 45 |
| Node Power | 46 |
| Vibration sensor/acceleration sensor | 50 |
| Acoustic sensor | 60 |
| Computational means/Processor | 72 |
| Communication | 74 |
| Storage | 76 |
| Wind farm | 80 |
| System for operating a wind turbine generator | 90 |
| Controller system | 92 |
| Monitoring | 100 |
| Identifying | 110 |
| Processing | 120 |
| Wake conditions | 130 |
| Wind direction | 132 |
| Sensory input | 140 |
| Establishing wake management | 200 |
| Wake management | 230 |
| Synchronizing | 240 |
| Determining | 300 |
| Control setting | 350 |
| Operating | 400 |
| Rotational speed/Power production | 610 |
| Establishing wake management | 1000 |
| Optimizing operation of wind farm | 2000 |
| Machine learning | 3000 |
| Time series data | 3080 |
| Labelled Time series data/Labelled data | 3085 |
| Unlabelled Time series data/Unlabelled data | 3086 |
| Supervised machine learning | 3010 |
| Supervised machine learning model (SML) | 3015 |
| Un-supervised machine learning | 3020 |
| Un-supervised machine learning model (USML) | 3025 |
| Training | 3100 |
| Grouping | 3110 |
| Associating | 3120 |
| Verifying | 3200 |
| Comparing | 3220 |

Figure 1:
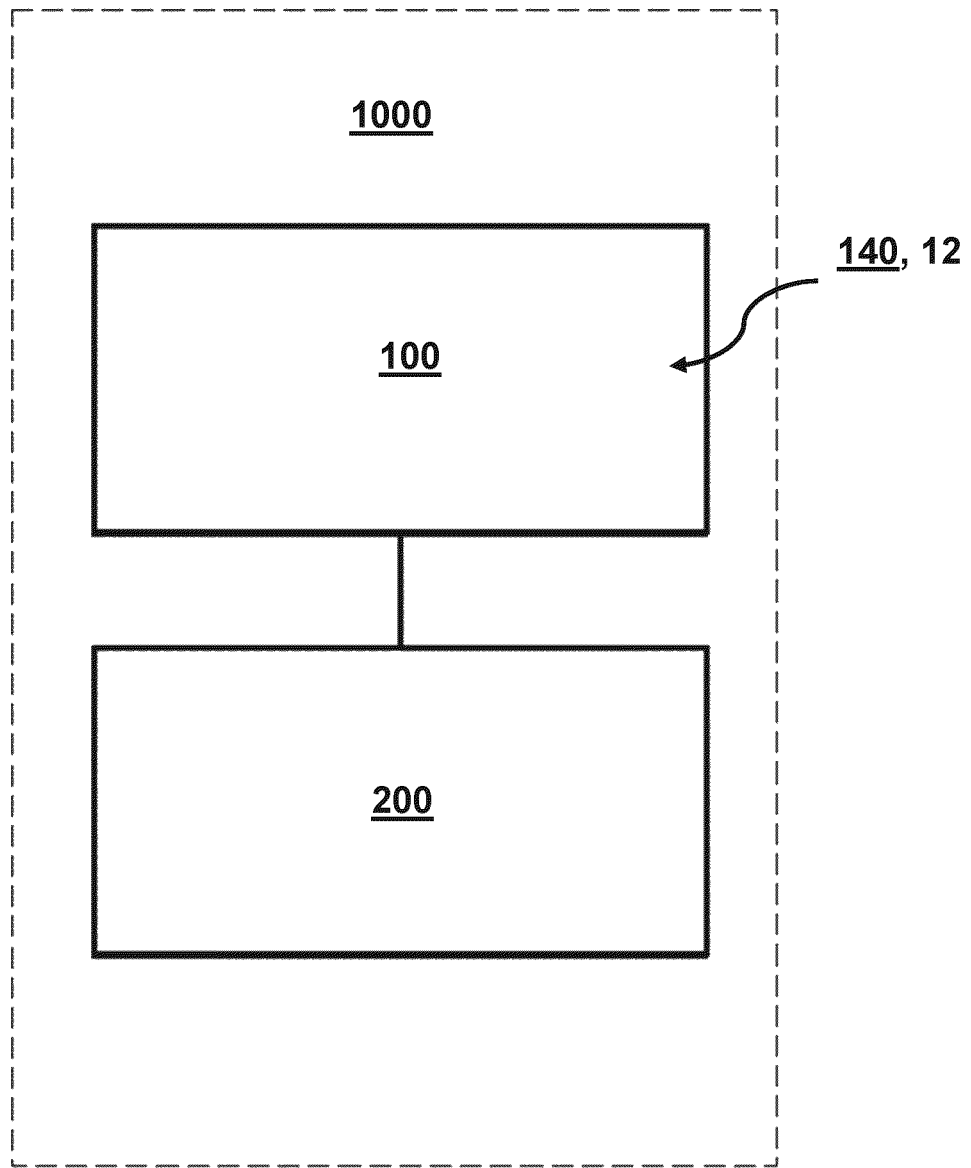
FIG. 1 illustrates a method of establishing wake management.

FIG. 1 illustrates a method of establishing 1000 a wake management 230 of a wind farm 80, see FIGS. 10 to 14. The method 1000 comprises an act of: monitoring 100 one or more wake conditions 130, see FIGS. 12 and 13, using one or more sensors 40 from one or more wind turbine generators 12 (WTGs), see FIGS. 4 and 6.

There is an act of establishing 200 a wake management 230 of the wind farm 80 as a function of the wake conditions 130.

The act of monitoring is performed based on sensory input 140 from the wind turbine generator 12. The sensory input 140 may comprise data from sensor nodes placed in the wind turbine blades.

Figure 2:
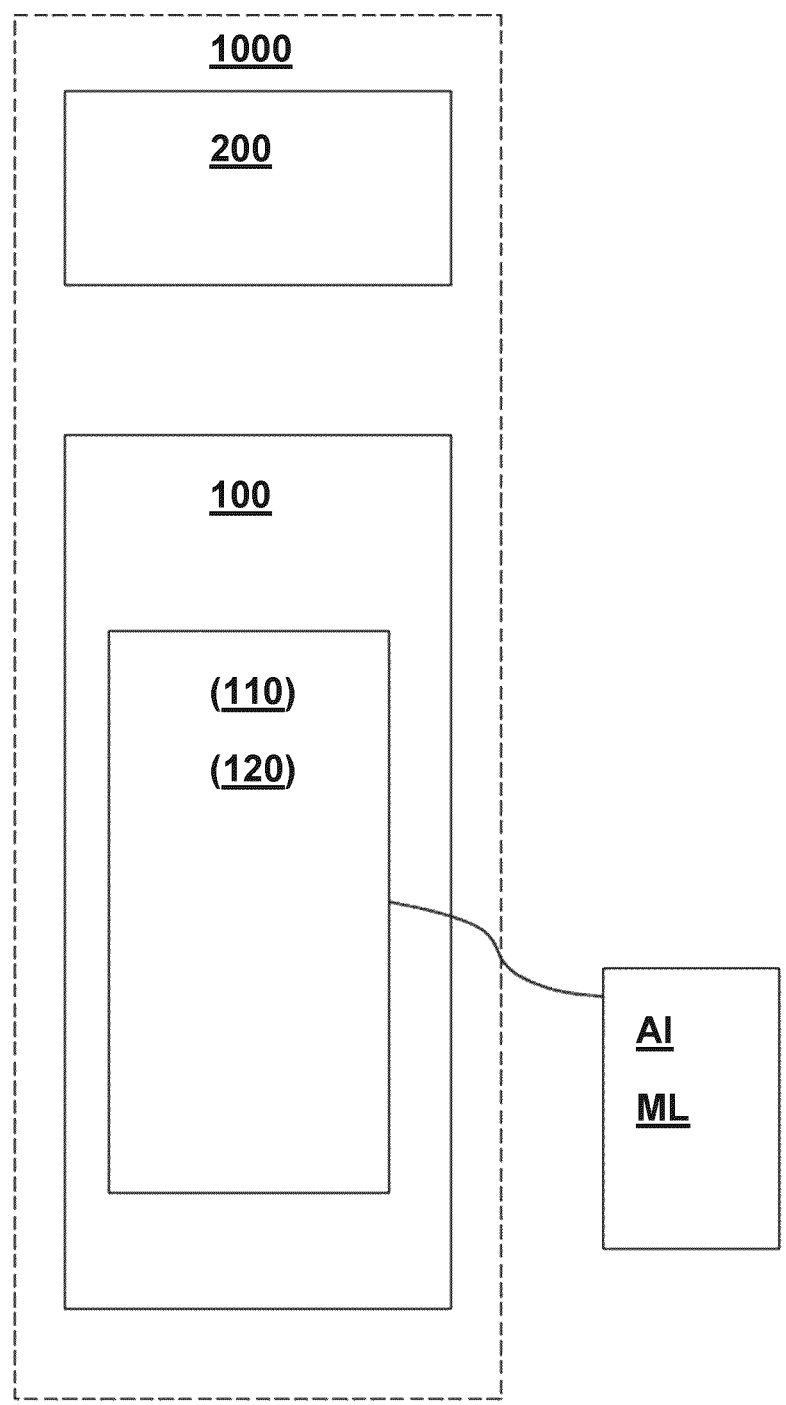
FIG. 2 illustrates further aspect of identifying wake conditions.

FIG. 2 illustrates further aspect of identifying wake conditions. It is noted that the act of monitoring 100 may be performed independently of the act of establishing 200 a wake management 230.

Figure 10:
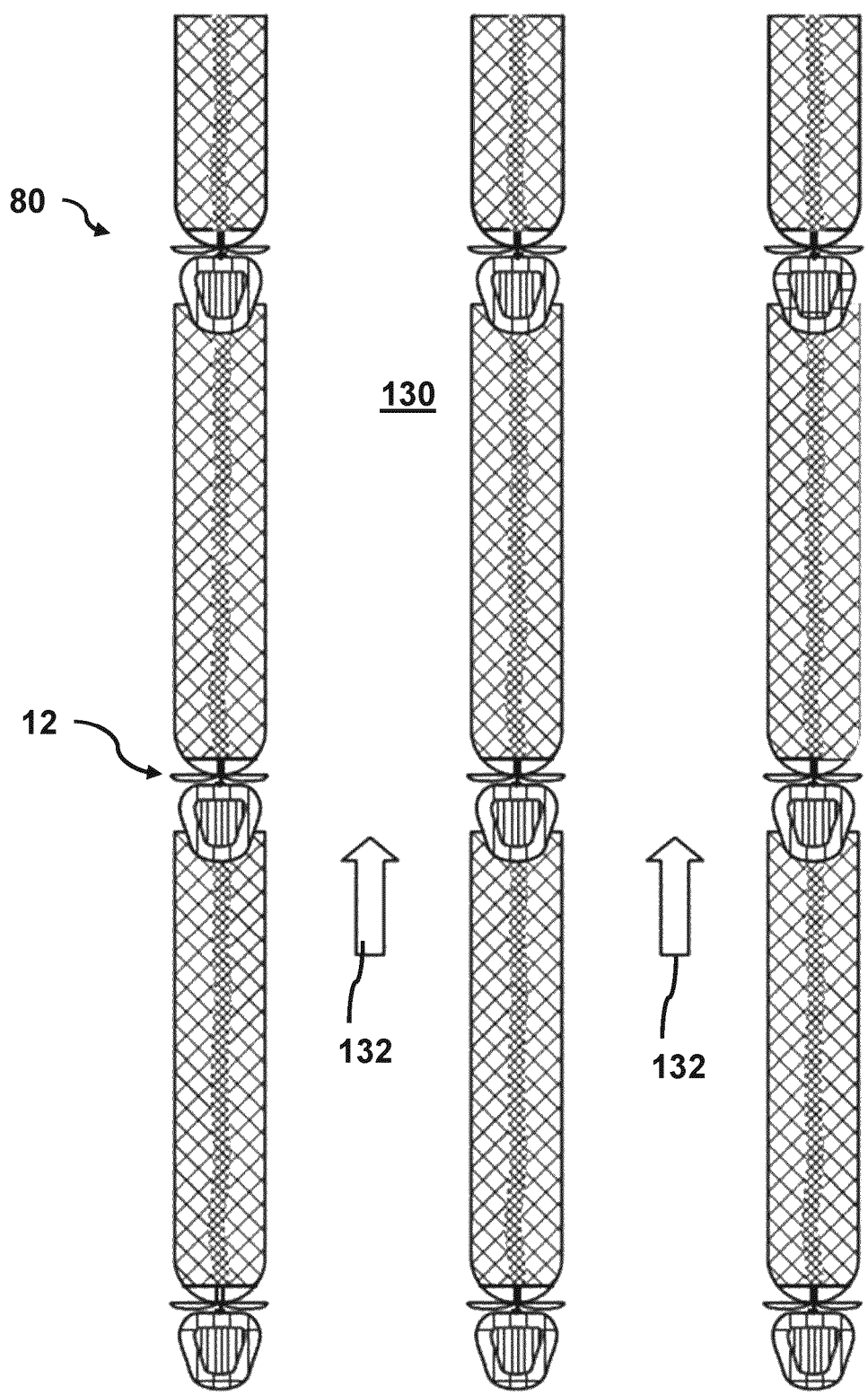
FIG. 10 illustrates a wind farm without wake management.
Figure 13:
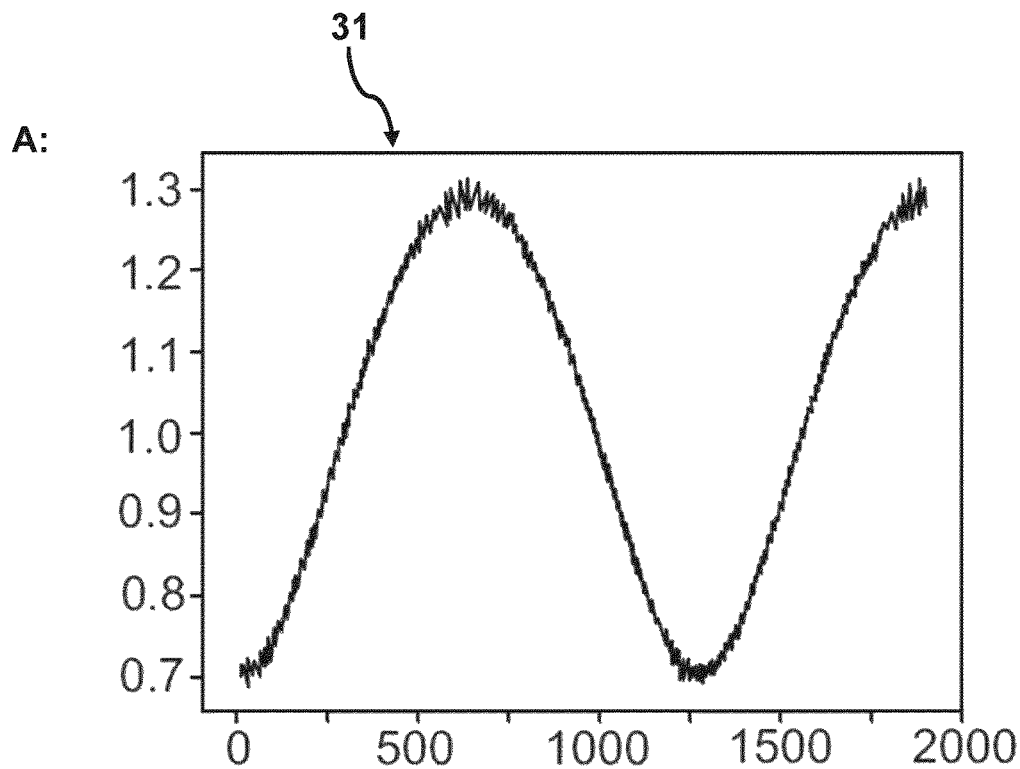
FIG. 13 illustrates calculation of calculating turbulence intensity for a wake map.
Figure 13:
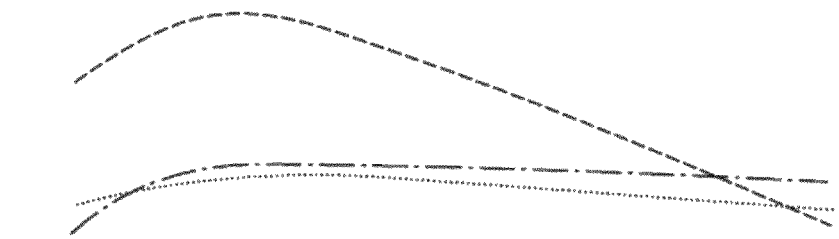

The act of monitoring 100 may be performed by identifying 110 the respective one or more wake conditions 130, see FIGS. 10 and 13, by an act of processing 120 sensory data 31 provided from the respective one or more wind turbine generators 12 (WTGs).

The act of processing 120 sensory data 31 involves identifying aerodynamic conditions as wake conditions 130 in the sensory data 31; see FIG. 13 as one example.

Figure 5:
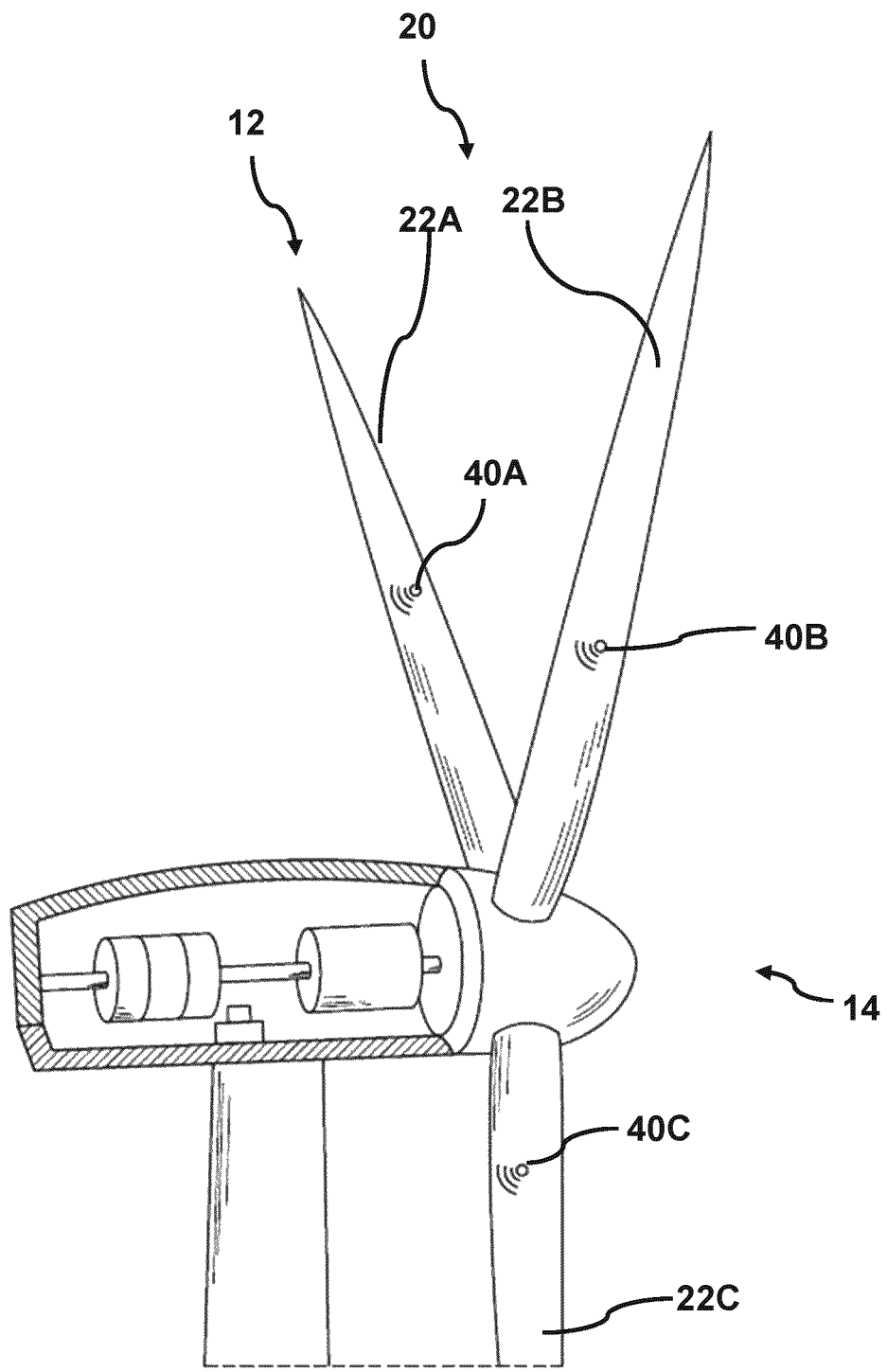
FIG. 5 illustrates a sensory arrangement inside blades.
Figure 6:
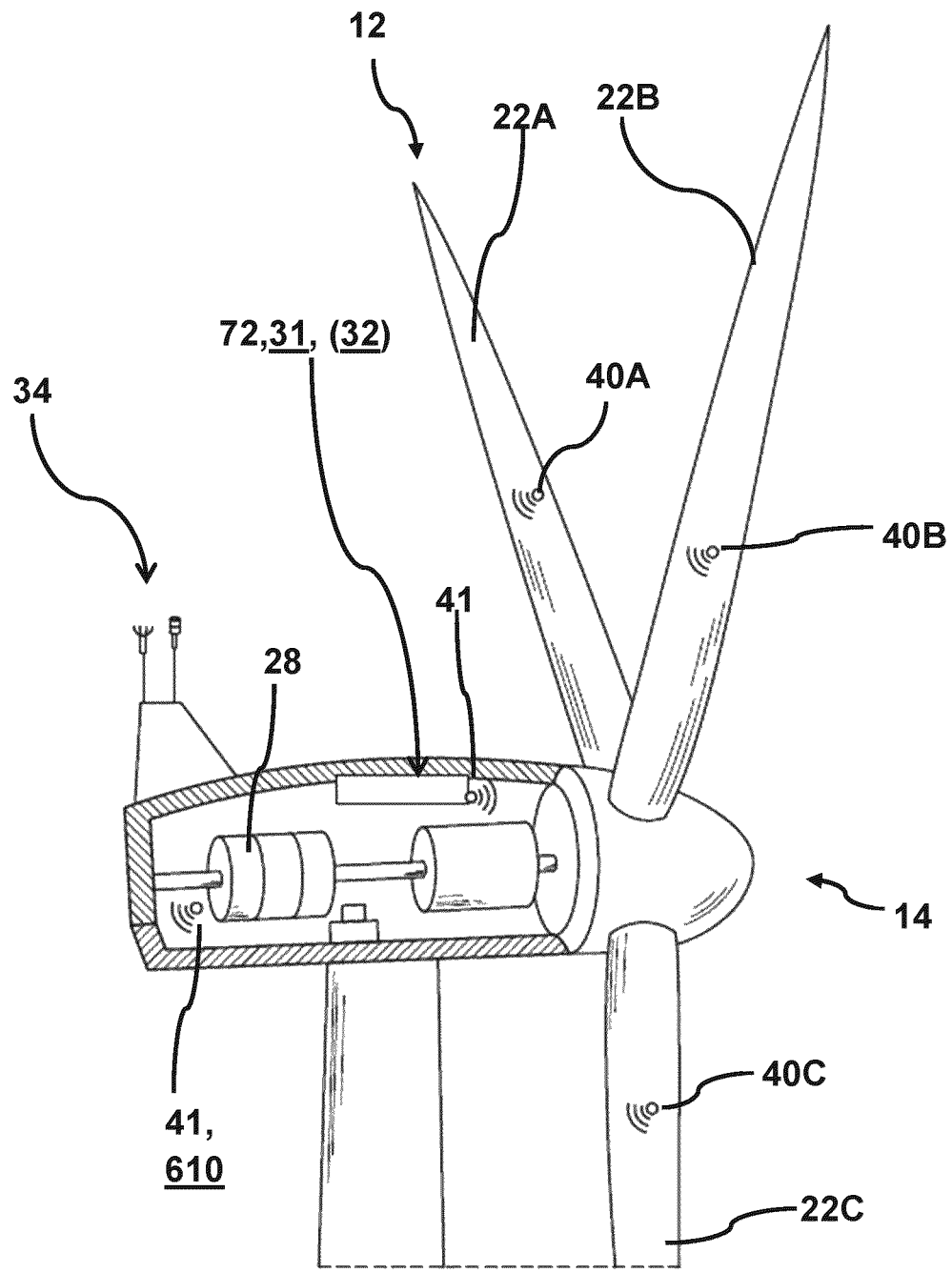
FIG. 6 illustrates further aspects of a sensory arrangement.
Figure 7:
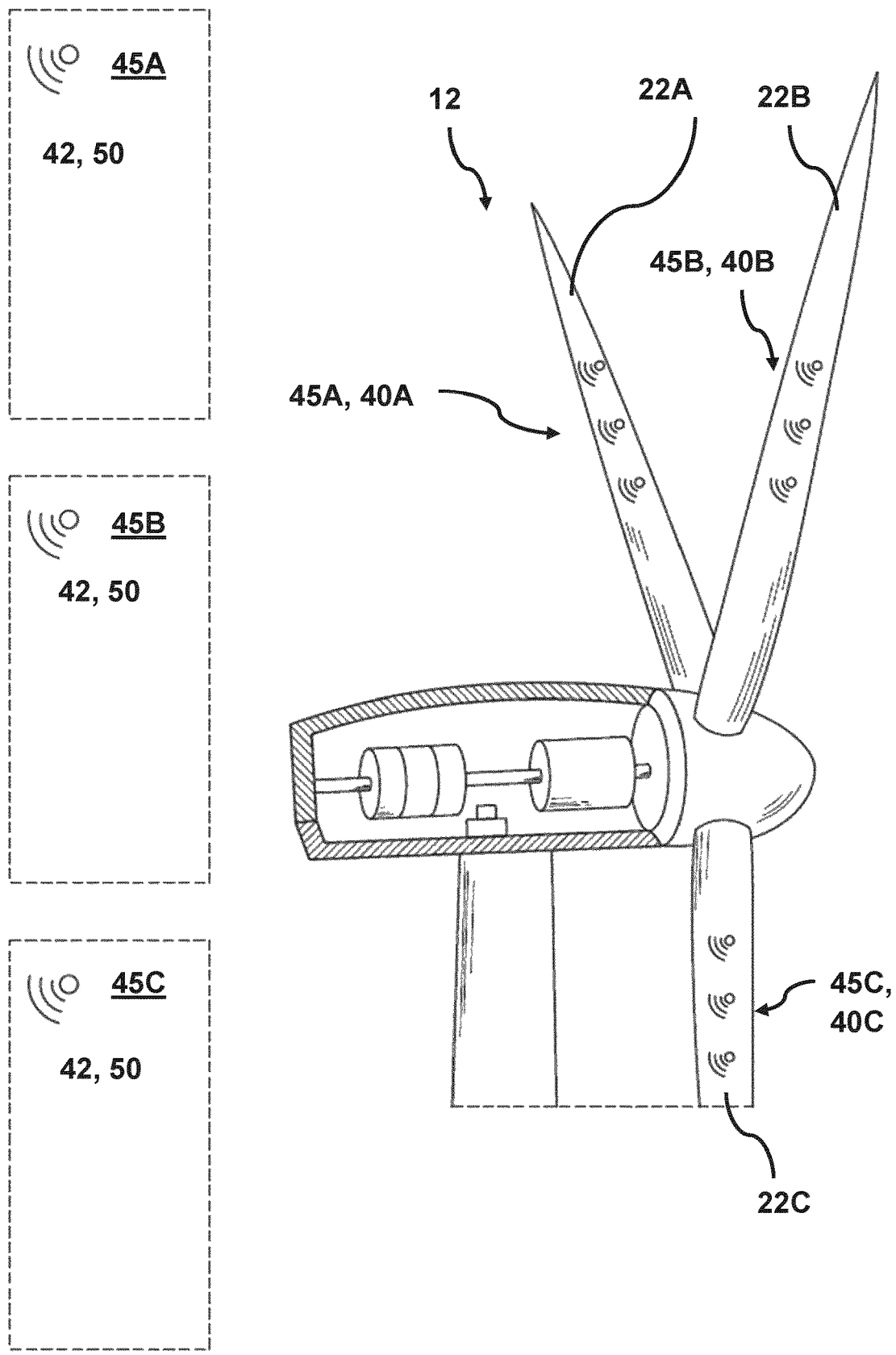
FIG. 7 illustrates further optional or alternative aspects of sensory arrangement on a wind turbine generator, including a sensor node arrangement.

The act of monitoring 100 may be based on rotor sensory data 42, see FIGS. 5 to 7.

Figure 4:
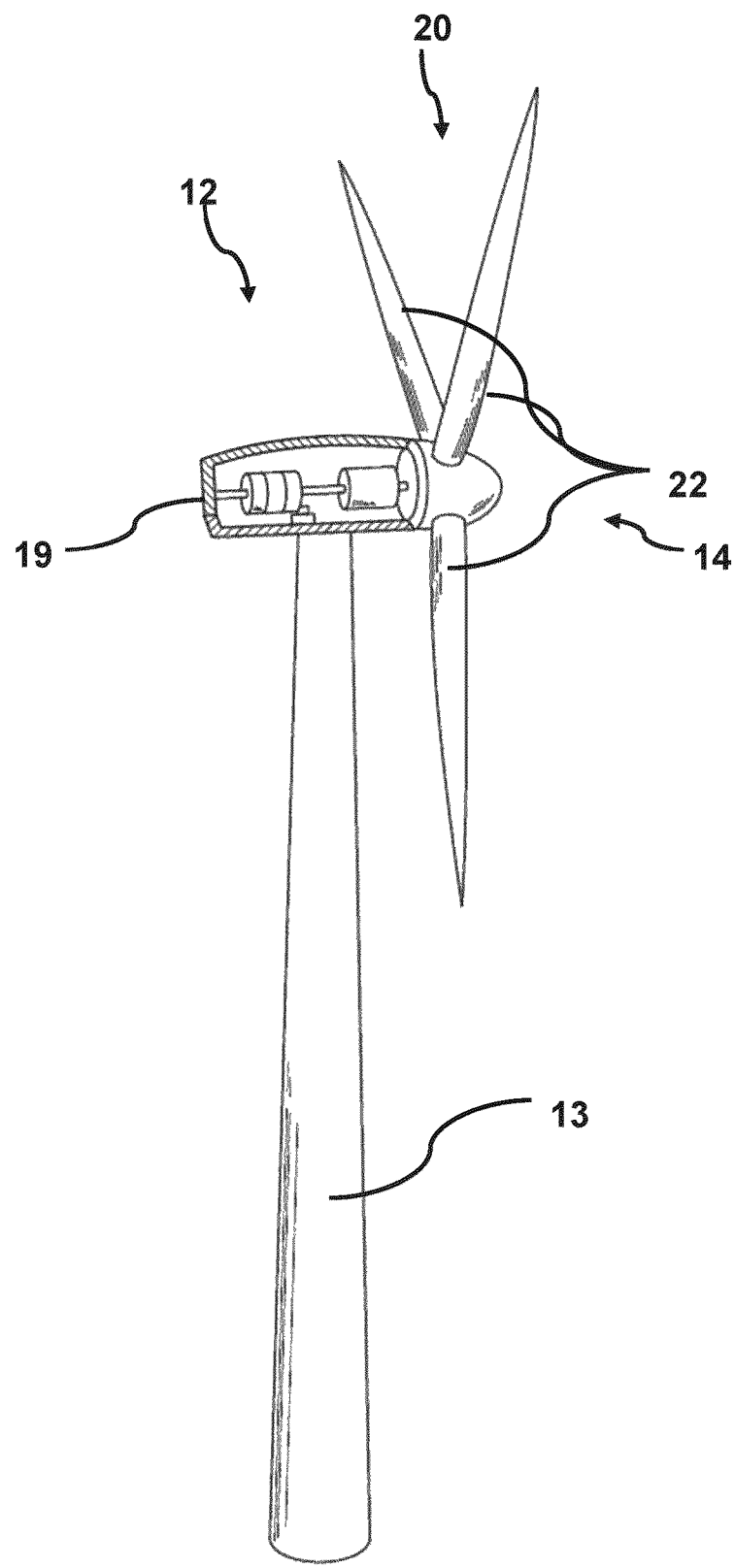
FIG. 4 illustrates a wind turbine generator.

In particular, the act of monitoring may be performed based on one or more vibration sensors 50, see FIG. 7, placed in or on one or more of the blades 22 of the rotor 14, see FIG. 4.

Acts of monitoring 100, including acts of identifying 110 or processing 120, may be performed using machine learning, ML, and/or artificial intelligence, AI.

Figure 3:
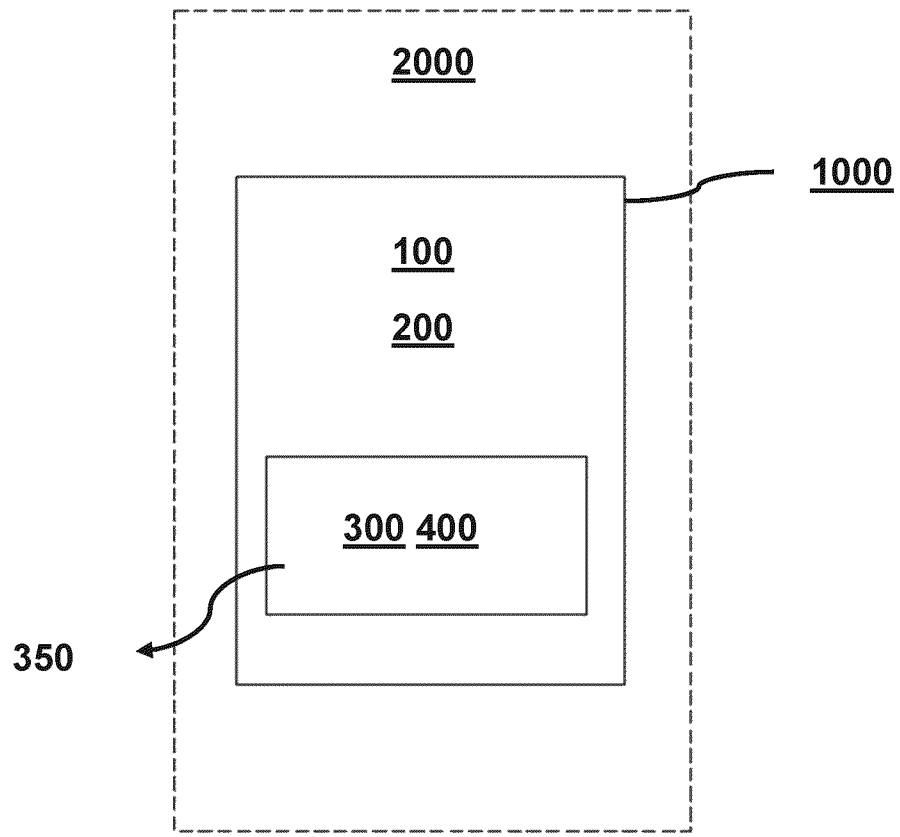
FIG. 3 illustrates a method of operating a wind turbine generator using wake management.

FIG. 3 illustrates a method of operating a wind turbine generator 12 using wake management 230.

Figure 11:
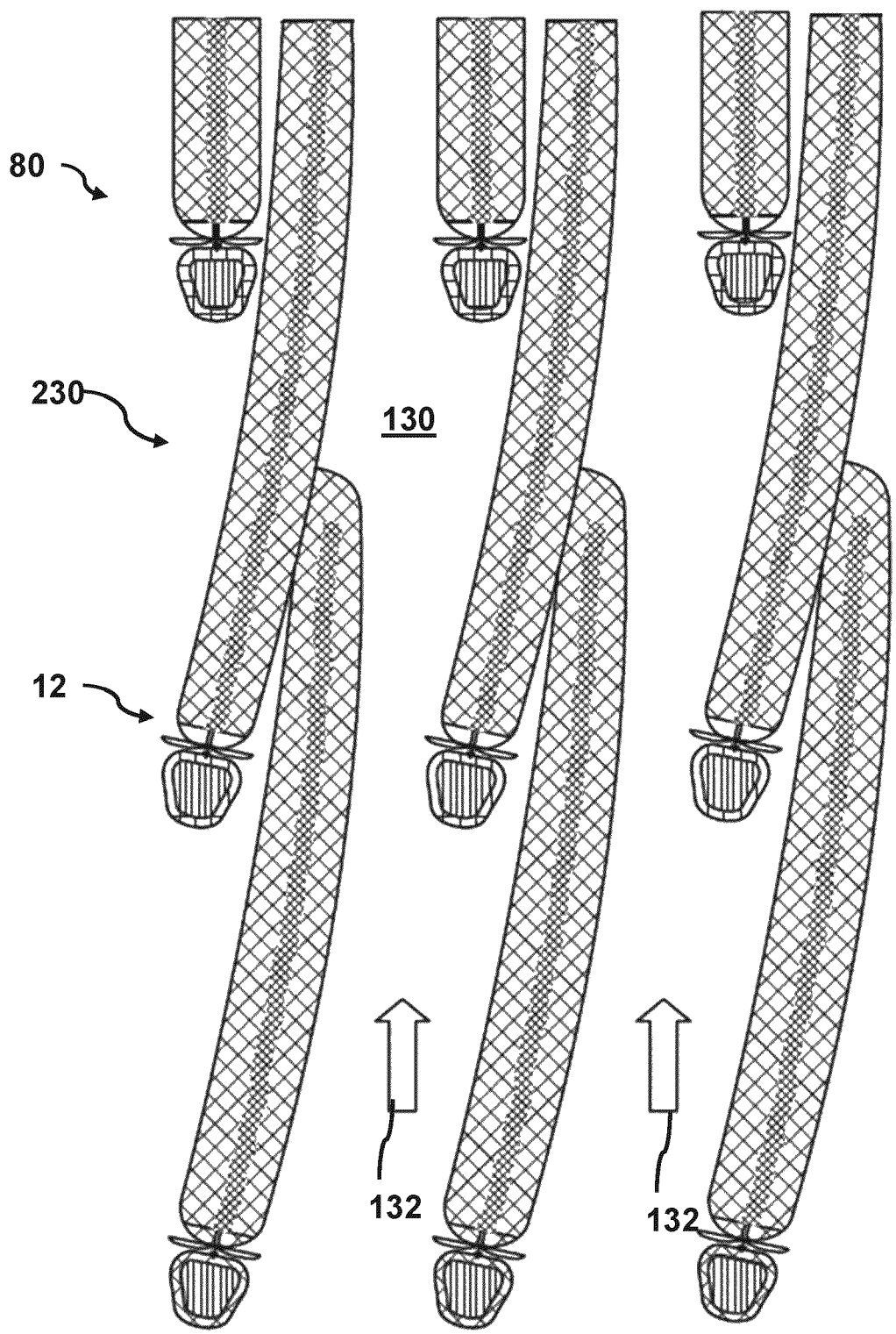
FIG. 11 illustrates a wind farm with wake management.

Illustrated is a method of optimizing 2000 operation of a wind farm 80 with multiple wind turbine generators 12 (WTGs), see FIGS. 10, 11. The method comprises the following acts:

There is an act of monitoring 100, say using one or more sensors 40, one or more wake conditions 130 from one or more wind turbine generators 12 (WTGs).

There is an act of establishing 200 a wake management 230 of the wind farm 80 as a function of the wake conditions 130.

There is an act of determining 300 individual wind turbine generator 12 (WTG) control settings 350 as an optimized power production function of the wake management 230 and individual wind turbine generator 12 (WTG) parameters, see FIGS. 10, 11, 12, and 14.

There is an act of operating 400 one or more wind turbine generators 12 (WTGs) in the wind farm 80 based on the individual wind turbine generator (12) (WTG) control setting 350.

The act of monitoring 100 may be performed as outlined in FIG. 2.

In one aspect of operating or optimizing 2000, the act of determining 300 individual wind turbine generator 12 (WTG) control settings 350 is performed by minimizing the total wake in the wake management 230 as a function of the wake conditions 130.

In one aspect the act of operating 400, one or more wind turbine generators 12 (WTGs) involve an act of pitching, yawing, regulating rotational speed, or combinations thereof; as is indicated in FIG. 11.

FIG. 4 illustrates a wind turbine generator 12 (WTG) comprising a tower 13 supporting a nacelle 19 with blades 22 rotably connected and forming a rotor 14.

FIG. 5 illustrates a sensory arrangement on blades 22A, 22B, 22C on a wind turbine generator 12 with a rotor 14. The blades 22A, 22B, 22C are a set of rotor blades 20. Each blade 22A, 22B, 22C comprises a set of blade sensors 40A, 40B, 40C as sensor means 41. In the present case, each set of blade sensors 40A, 40B, 40C comprises a blade sensor 42A, 42B, 42C. The blade sensor 42 may be a vibration 50 sensor or an acoustic sensor 60.

The sensory arrangement may be part of a system for detecting turbulent intensity to form input for a wake field map.

A blade sensor 42 is configured to be in communication 74 with a controller or computational means 72. The communication 74 may be wired or wireless as illustrated here.

The wind turbine generator 12 is disclosed with a set of blade sensors 40A, 40B, 40C on each blade 22A, 22B, 22C. However, each blade 22A, 22B, 22C experience the same conditions since the blades 22A, 22B, 22C move in a single common plane. Thus, the invention can be obtained by a wind turbine generator 12 having one blade 22 of the set of blades 20 with a set of blade sensors 40. The set of blade sensors 40 may be one, two or more blade sensors 42A, . . . , 42N.

FIG. 6 illustrates further aspects of sensory arrangements on a wind turbine generator 12. There may be a timer or clock configured to provide data 31 from the sensory means 41 with a timestamp 34, which thus provides timestamped data 32 or synchronized data for processing by the computational unit 72.

The wind turbine generator (WTG) 12 is with a rotor 14 and a set of rotor blades 20. The set of rotor blades 20 is with three rotor blades 22A, 22B, 22C.

Each blade 22A, 22B, 22C comprises a set of blade sensors 40A, 40B, 40C. In the present case each set of blade sensors 40A, 40B, 40C comprises a blade sensor 42A, 42B, 42C.

A further sensor means 41 is shown at the generator 28. In this embodiment, the further sensor is a rotary sensor (RPM-sensor or vibration sensor), such as a high sampling speed sensor measuring the rotational speed 610. The system may be configured for an act of synchronizing 240, as shown in FIG. 2 or variations thereof, and based on sensors 42ABC, and synchronization is performed against at least one other sensor 41 using the timestamp 34 to obtain timestamped data 32.

The sensor means 41 at the generator 28 may be a Rogowski coil arranged for precision measurements fluctuations in the generator output.

The sensory arrangement may be part of a system for operating a wind turbine generator. The computational means 72 or controller may be a single unit or distributed as illustrated here.

The wind turbine generator 12 is disclosed with a set of blade sensors 40A, 40B, 40C on each blade 22A, 22B, 22C. However, each blade 22A, 22B, 22C experiences the same conditions since the blades 22A, 22B, 22C move in a single common plane. Thus, the invention can be obtained by a wind turbine generator 12 having one blade 22 of the set of blades 20 with a set of blade sensors 40. The set of blade sensors 40 may be one, two or more blade sensors 42A, . . . , 42N.

FIG. 7 illustrates further optional or alternative aspects of a sensory arrangement on a wind turbine generator 12.

The sensors 42 may be implanted as a sensor node 45 (see FIG. 9) as illustrated by sensor nodes 45A, 45B, 45C. A sensor node may have a vibration sensor 50, and an acoustic sensor 60. There may also be additional sensor means 41.

A sensor node 45 may comprise essential processing 72 and be adapted for performing the acts or at least part of the acts of measuring.

A set of sensors 40 may be understood as a sensor node 45 with one or more sensors. Such a sensor node 45 may comprise processors or means to configure, collect, store and process generated sensor data. A sensor node 45 may have communication means to communicate with a controller (not shown) or other sensor nodes. A sensor node 45 may have means to synchronize 240 (as illustrated previously) say sensors 50, 60 using a timestamp 34.

Figure 8:
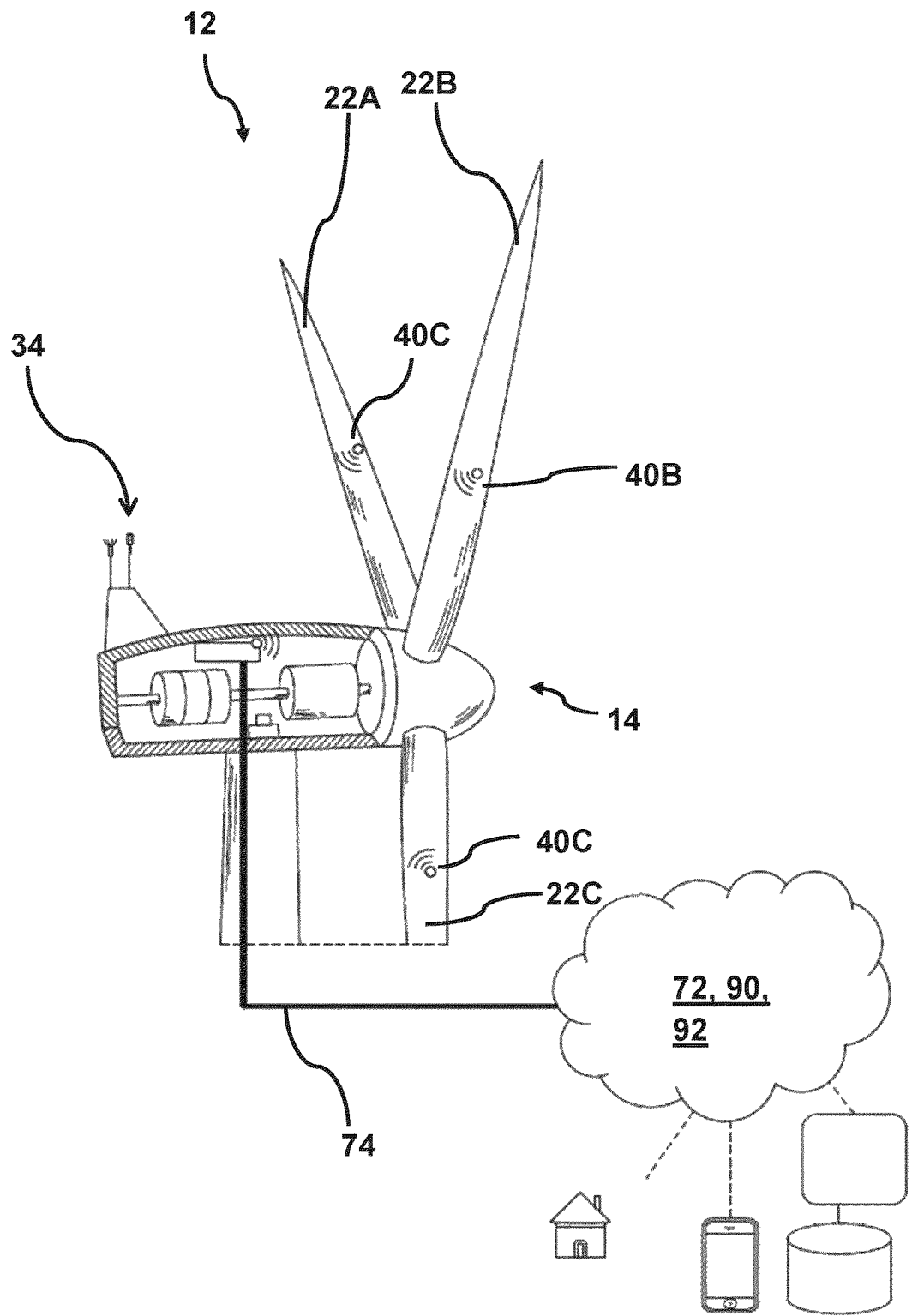
FIG. 8 illustrates a wind turbine generator with a sensory arrangement in interaction with a remote-/cloud-based processor.

FIG. 8 illustrates a wind turbine generator 12 with a sensory arrangement in interaction with a remote/cloud-based processor 72 as part of a system for operating a wind turbine generator 90.

The rotary device 10 comprises a set of rotor blades 20. The set of rotor blades 20 consists of three rotor blades 22A, 22B, 22C.

Each blade 22A, 22B, 22C comprises a set of blade sensors 40A, 40B, 40C. In the present case, each set of blade sensors 40A, 40B, 40C comprises a blade sensor 42A, 42B, 42C.

The data sets 30 are processed by computational means 72. The wind turbine generator 12 may have a clock for generating a timestamp 34. In this case the time stamp is further synchronized and delivered from a global time server. Hence, the datasets 30 may be timestamped data 32. Alternatively, a sensor node 45 may be configured to generate data that is synchronized, and the timestamp 34 may be applied at sensor node 45 level.

The system 70 may interact with an operator system, a mobile device, a client server and a storage or database via a cloud/connection service. Further access or mirroring or monitoring may be available via the cloud for long term monitoring, alerts or service programmes.

The methods and acts of measuring sensory data disclosed herein may be performed in a single processor 72 device or be distributed as illustrated here.

Figure 9:
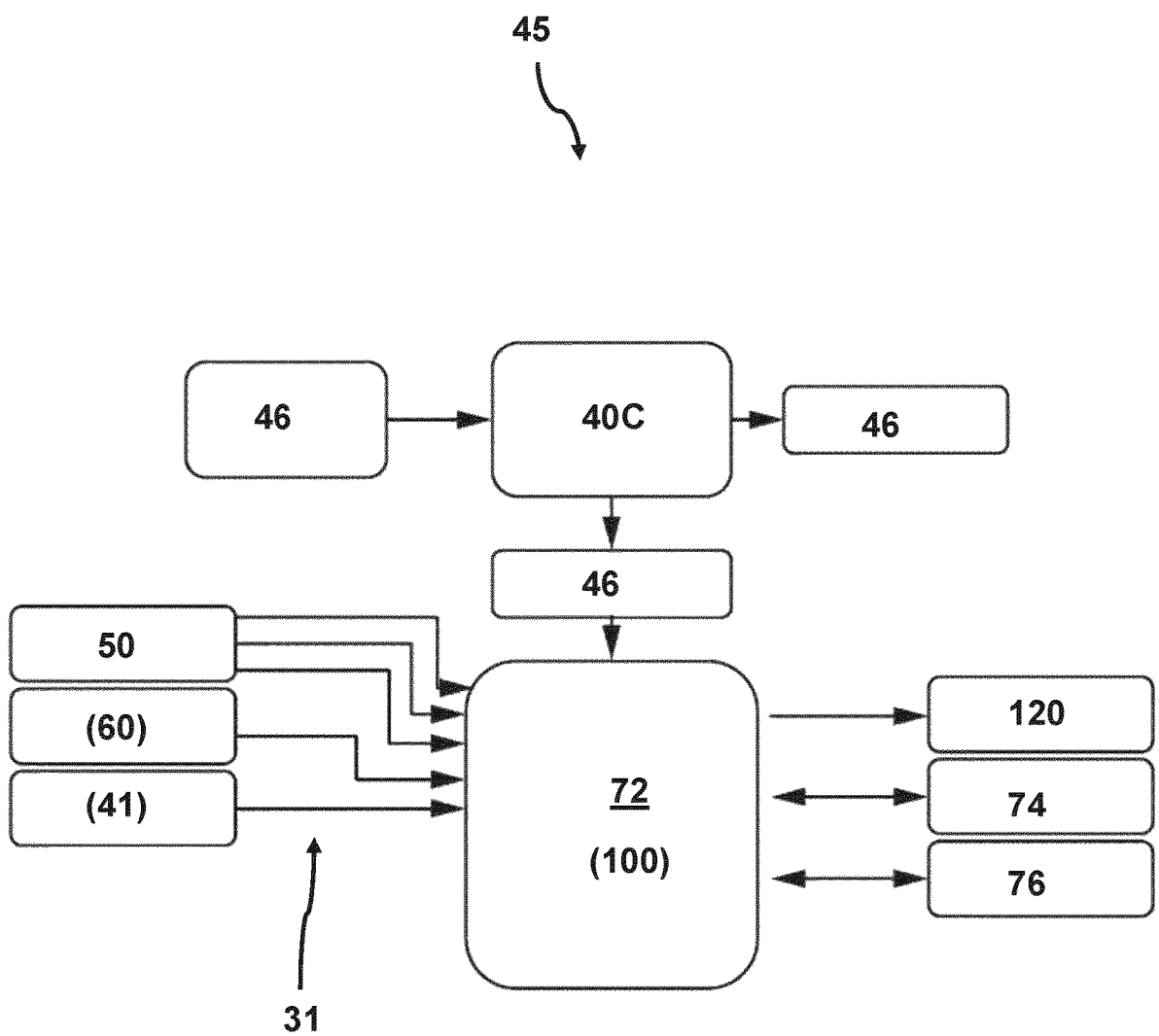
FIG. 9 illustrates a configuration of a sensor node.

FIG. 9 illustrates a configuration of a sensor node 45. There is a node power 46 management layout, which may include a source of energy, storage of energy, a controller of power management and an interface for configuration/control and possibly charging.

The sensor node 45 is illustrated with a processor or computational means 72. The sensor node 45 includes sensory means 41 generating data 31. Illustrated is a vibration sensor 50, which in this case has three lines of output and could e.g. be a tri-axial accelerometer. Optionally, there is an acoustic sensor 60. Optionally, there are further sensor(s) means 41.

The computational means 72 may be adapted to perform instructions to perform one or more, or all of the acts as outlined to perform measuring or sampling sensor data.

The sensor node 45 is configured with communication means 74 and here with storage means 76.

FIG. 10 illustrates a wind farm 80 without wake management 230.

The wind farm 80 comprises a set of wind turbine generators 12 experiencing a wind direction 132 resulting in, due to the positioning and the orientation of wind turbine generators 12, a specific wake conditions 130. The wind is coming as indicated by the two arrows, and it can be seen that the turbines from second and third row are in the wake of the turbines behind.

FIG. 11 illustrates a wind farm 80 with wake management 230; The wind is coming as indicated by the two arrows, and it can be seen that, due to the wake management, the turbines are now oriented in such a way that the impact of the wake field is reduced.

Figure 12:
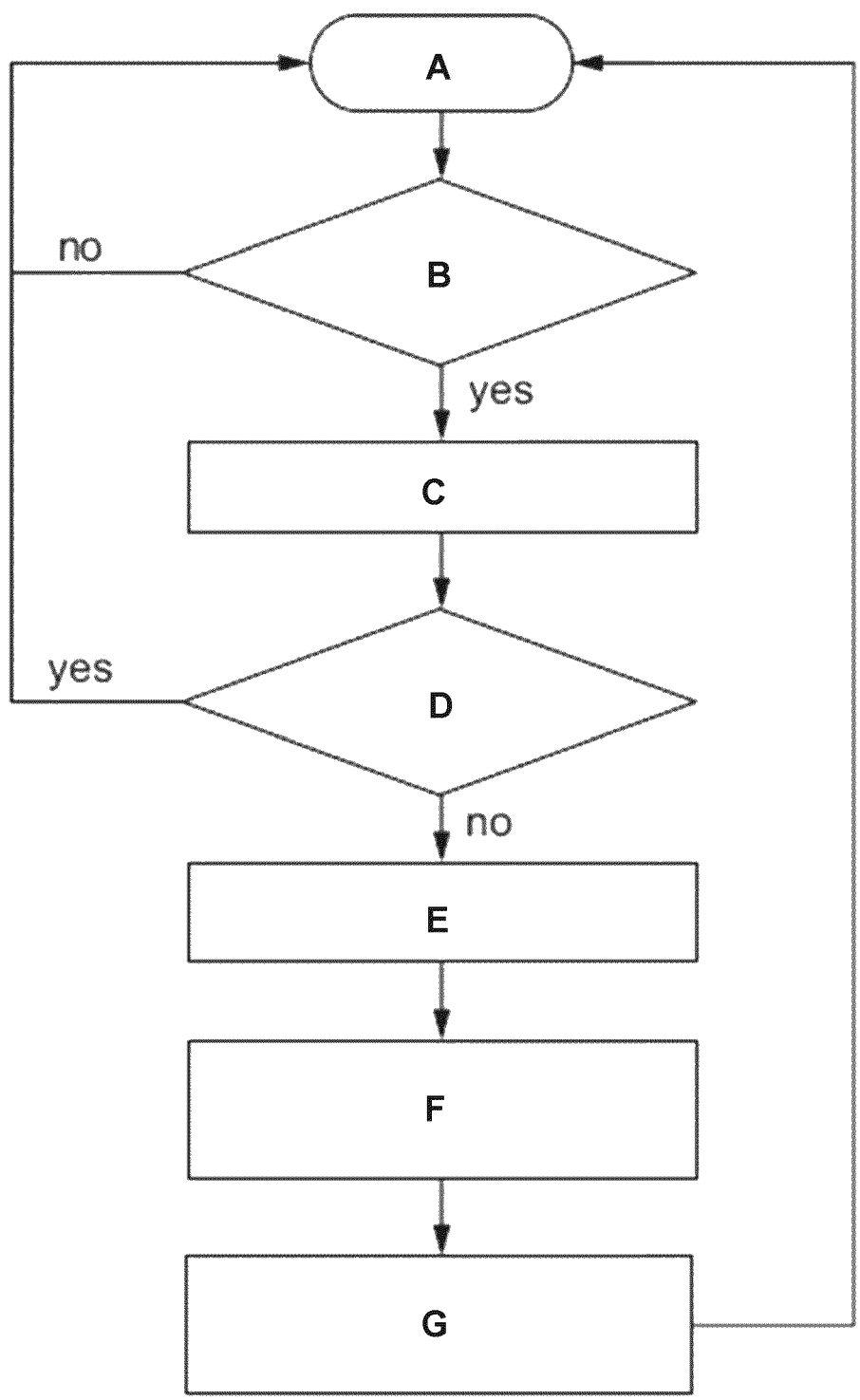
FIG. 12 illustrates a process of wake management.

FIG. 12 illustrates a process of wake management 230. With reference to the flow chart and the previous description, the flow chart outlines operation of a wind turbine park taking a wake field map into account.

A: There are start conditions and assessment;
B: Determines if WTGs are in operation?
C: Detecting/determining turbulence intensity on individual WTGs;
D: Determines if the turbulence intensity level is acceptable for all WTGs?
E: Transmit/send data/information of turbulence detection period to general data collection box;
F: Calculate and define strategy for wake reduction according to defined wake management objective as a function of the established wake field of turbulence intensity;
G: Send/transmit instructions and/or strategy from collection box to all WTG controllers of a wind farm.

As for D, then D can include supervised or unsupervised machine learning techniques, using the vibration data from the sensor nodes and the LiDAR unit for labeling the data (if supervised). The algorithms take as input the vibration measurements of one or more sensors, and they output the turbulence intensity, either expressed as a percentage (0 to 100%) or a unity number (0 to 1), depending on the use.

As for F, the calculation may as an example of wake management optimization could be established as:

$$maximize \sum_{i=1}^{N} Power_i(\theta_i, t_i, wc_i, r_i \text{ and/or } p_i \text{ and/or others})$$

subject to:
Wake Minimization:

$$\theta_i \in (\theta_{min}, \theta_{max})$$

$$t_i \in (t_{min}, t_{max})$$

$$r_i \in (r_{min}, r_{max})$$

$$p_i \in (p_{min}, p_{max})$$

or others
Wake Minimization+Optimizing Turbine Lifetime:

$$l_i \in (l_{min}, l_{max})$$

or others
where:
Power$_i$—power output from WTG$_i$
N—number of turbines in the wind farm (included in the optimization)
$\theta_i$—static yaw misalignment from WTG$_i$
$t_i$—turbulence intensity from WTG$_i$
$r_i$—rotor rpm from WTG$_i$
$p_i$—blade pitch angle from WTG$_i$
$l_i$—average yaw misalignment from WTG$_i$
Output for each individual WTG$_i$: [$\theta_i$, $r_i$ and or $p_i$ and/or others]

FIG. 13 illustrates calculation of turbulence intensity for a wake map.

With reference to previous figures, there is an example of calculations for turbulence intensity (TI) detection using accelerometer data only from sensors 42 located inside wind turbine blades 22.

The data is obtained as acceleration data of 3-axis accelerometers placed identically as possible in all blades of a of a wind turbine generator. The three axes of an accelerometer sensor (channel1, channel2 and channel3) are all perpendicular to each other, in order to record acceleration from every possible direction.

The length of the sensor data is defined by:

$$\text{length} = \text{Sqrt}(\llbracket \text{channel1} \rrbracket \hat{\ }2 + \llbracket \text{channel2} \rrbracket \hat{\ }2 + \llbracket \text{channel3} \rrbracket \hat{\ }2).$$

This length is used for the calculations since it is independent from the orientation of the sensor 42 (the way it is installed in the blades). No matter what orientation the sensor 42 is installed with, in the blade 22, the output of the length would always be the same.

FIG. 13A shows what the length of a sensor looks like inside a wind turbine blade for one and a half rotation. FIG. 13B, shows the feature extraction and metric calculation.

To get rid of the influence of the installation distance of the sensor to the centre of the rotor, in a pre-processing process we centre and reduce the output length of the data.

Direct calculations may be applied data from the accelerometers from the blades to determine the turbulence intensity. Machine learning algorithms may also be applied to data from accelerometers from the blades in order to detect the turbulence intensity of the wind hitting the blades.

In order to label the full data and train the system, LiDAR data from a temporary installed LiDAR providing information about the actual turbulence intensity may be used.

FIG. 13C—shows the feature comparison and turbulence intensity determination. The "- - -" line yields a turbulence index of "0.5", The "_____" line yields a turbulence index of "0.2". The "-.-." line is an example of a turbulence index to be determined, which may be based on the known turbulence intensities. The turbulence intensity may be determined according to a metric as indicated. The input of the Machine Learning (ML) algorithm is metrics of the centred-reduced length of acceleration data.

The metrics may be chosen from a variety of well-known measures, e.g.: Kurtosis, Crest factor, frequency of RPM, etc. The output is a Turbulence Intensity value.

The method of operating using wake management 230 may be performed by defining two or three wind turbines of the wind farm enduring the highest wake effect. There may be a test communication/control system, optionally over the whole wind far, that addresses optimizing the two or three turbines defined.

There may be a test of autonomous calculation (decision making) system focusing on the two to three turbines.

There may be a test of an individual WTG load when operating, say with yaw misalignment.

Based on the wake field map established by the sensors, e.g. accelerometers, a wake management strategy is defined and selections/options are made as to what extent the management strategy is to be applied: globally or locally, all turbines/only a set of turbines, what shall be controlled (yaw, pitch, load, all), etc.

Before applying the wake management strategy, there may be a test communication/control system and autonomous calculation system for all the wind farm.

Figure 14:
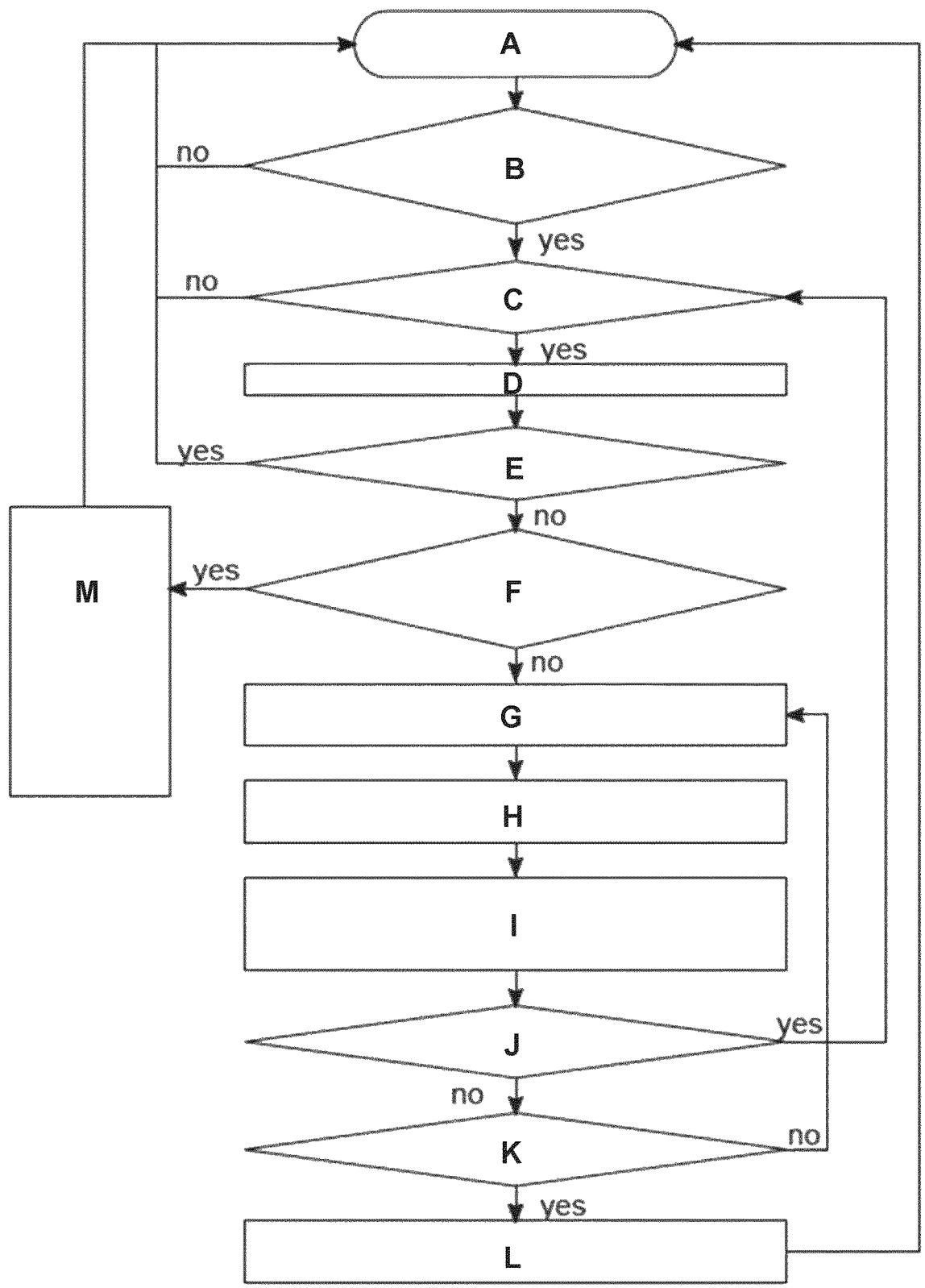
FIG. 14 illustrates a process of wake management.

FIG. 14 illustrates a process of wake management 230. With reference to the flow chart and the previous description, the flow chart outlines operation of a wind turbine park taking a wake field map into account.

A: There are start conditions and assessments;
B: Determine if the wind (aerodynamic) conditions have changed since last check?
C: Determine if some/all WTGs in operation?
D: Establish/detect turbulence intensity (aerodynamic conditions) on individual WTGs;
E: Determine if turbulence intensity (aerodynamic condition) level is acceptable?
F: Determine if the wake management/controllers know how to optimise operation with the turbulence intensity (aerodynamic condition)?
G: Send/transmit some/all current data on the turbulence intensity (aerodynamic conditions) and/or power output of the current period to the general collection box;
H: Perform calculations and define strategy for wake reduction according to the wake management objective;—an example may be according to step F in FIG. 12.
I: Apply new optimisation of wind farm; send/transmit instructions/controls and strategy from collection box to some/all wind turbine controller of the wind farm;
J: Determine if the wind condition (aerodynamic condition) changed?
K: Determine if the optimisation is sufficient/satisfactory?
L: Add new optimisation plan for new wind conditions (aerodynamic conditions) to a knowledge database (dictionary of optimizations)

There may further be the following step:
M: Apply optimization of wind farm from experience. Send out instructions and strategy from collection box to all wind turbine controllers in a farm.

As for step F: The wake management algorithm involves an optimization algorithm in order to speed up the process creates collections of experiences and every time when there is need for using a wake management, the procedure first looks at the collection. If the event is already registered in the collection, then the procedure does proceed with the same optimization algorithm again. Instead the procedure goes directly to Step M. If the event is not in the collection of experiences, then the procedure proceeds with the optimization, i.e., Step G.

Figure 15:
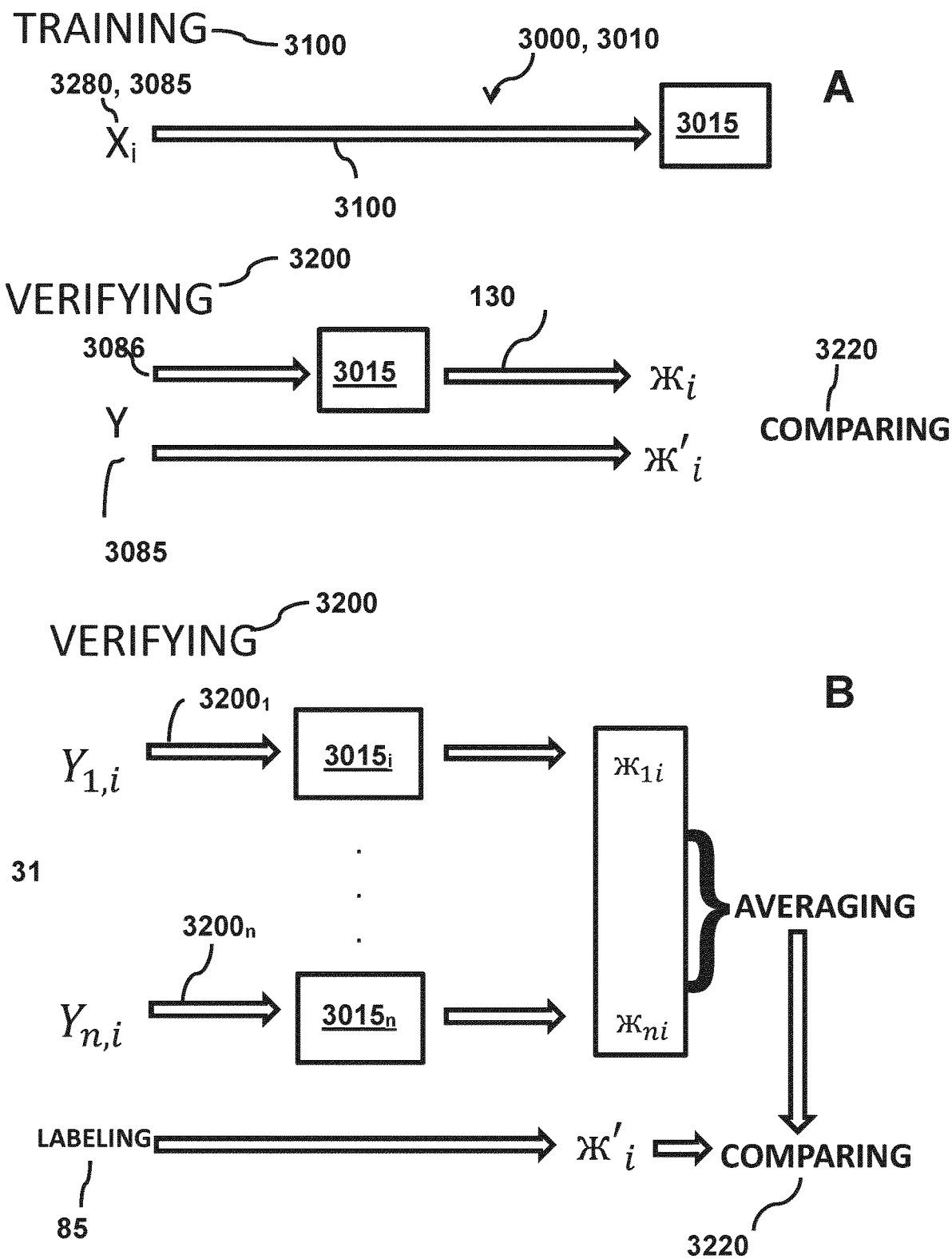
FIG. 15 illustrates what a person skilled in the art will recognize as machine learning and as a supervised machine learning.

FIG. 15 illustrates what a person skilled in the art will recognize as machine learning 3000 as a supervised machine learning 3010.

There is an act of training 3100 a supervised machine learning model (SML) 3015 with sensory data 31 of labeled time series data 3085 and building the supervised machine learning model (SML) 3015.

Actual training 3100 is based on sensory data 31 with data that are labelled 3085.

The training 3100 may associate data metrics with respect to wake conditions such as aerodynamic conditions such as turbulence, rain/hail etc. The training 3100 may associate data metrics with respect to turbulence intensity. Training results in a supervised machine learning model (SML) 3015.

There are one or more acts of verifying 3200 the supervised machine learning model (SML) 3015 by inputting a sensory data 31 of labelled time series data 3085 to the supervised machine learning model (SML) and outputting a calculated data label and comparing 3220 the output with known wake conditions 130.

The act of determining 1300 (not shown) may be the upper path of the verification is performed by inputting the sensory data 31 to the supervised machine learning model (SML) 3015 and outputting the wake condition 130 from the supervised machine learning model (SML) 3015.

The supervised machine learning model 3015 will train itself ("write its own algorithm") on data with a label 3085. As is apparent and to verify the quality of the algorithm or model, data where the outcome result is know is used to test the labelled data 85 against the model3 to compare the outcome to the known label.

FIG. 15B illustrates the supervised machine learning model 3015 as outlined where the acts of training 3100 is performed on respective n-vibration signals $31_{i,\ldots,n}$. (Not shown) generating respective 3015 supervised machine learning models $3015_{i,\ldots,n}$.

The acts of verifying $3200_{i,\ldots,n}$ comprises and is performed on respective n-multiple vibration signals $31_1, \ldots, 31_n$ obtained by corresponding n-multiple vibration sensors $40_1, \ldots 40_n$. The act of training 3100 is performed based on n-multiple labels ($Y_{1\ldots n}$).

The act of verifying 3200 comprises an is performed based on a predetermined average measure of the n-multiple labels ($Y_{1\ldots n}$) and finally by comparing 3220 the average with labeled 3085 data. The averaging may be a mean-average or similar average measures.

In this scenario several sensors are used individually and the results of the outcome are combined to find the best possible value.

Figure 16:
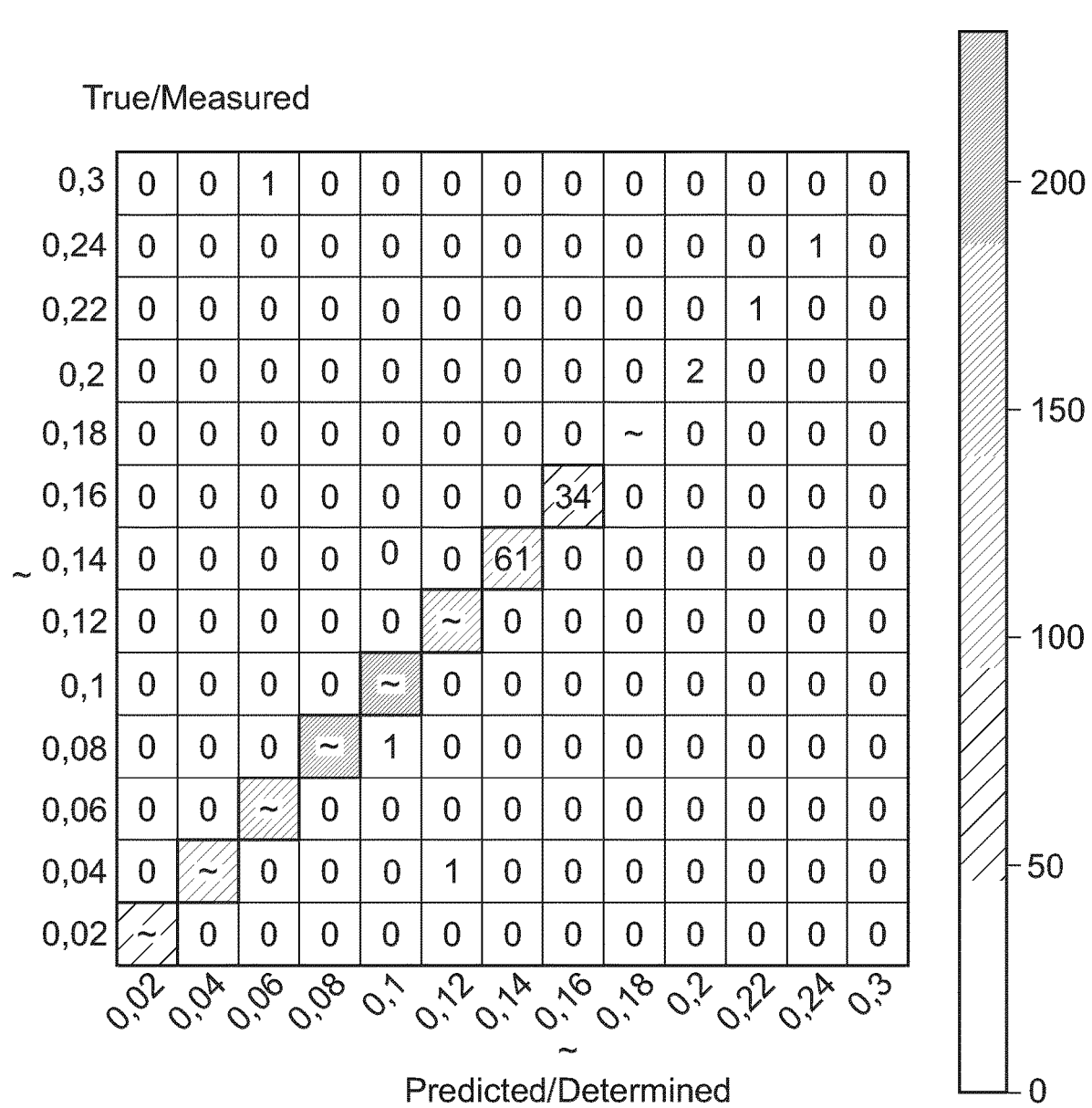
FIG. 16 illustrates a confusion matrix between predicted and measured data based on supervised machine learning algorithm of turbulence index.

FIG. 16 illustrates a confusion matrix between predicted and measured data based on supervised machine learning algorithm of turbulence index (TI). On the X-axis there are predicted turbulence intensities using the vibrations of the sensors. On the Y-axis, there are the true turbulence intensities, i.e. wake conditions, measured by a nacelle-based LiDAR Since the data are clustered around the diagonal, the algorithm has performed very well. Except for two or three values, all the others are exactly on the diagonal, which means that the algorithm is predicting very well the turbulence index (TI) for the wake management very well.

The invention claimed is:

1. A method of establishing a wake management of a wind farm, the method including the following steps:
monitoring one or more wake conditions using sensory data from one or more sensors;
processing the sensory data to identify the respective one or more wake conditions; and
establishing a wake management of the wind farm as a function of the identified one or more wake conditions;
the one or more sensors are accelerometers arranged as vibration sensors placed in one or more of the blades of a rotor from one or more wind turbine generators of the wind farm and using machine learning to process the sensory data to identify the wake conditions.

2. The method according to claim 1, wherein the step of processing sensory data includes identifying aerodynamic conditions such as turbulence, rain, or hail, as wake conditions from the sensory data.

3. The method according to claim 1, wherein the step of monitoring further includes monitoring power output using sensory data that includes rotor sensory data.

4. The method according to claim 1, wherein the step of monitoring further includes monitoring acoustic sensory data from an acoustic sensor.

5. The method according to claim 1, wherein the step of processing the sensory data includes processing sensory data that includes rotary sensory data provided by high frequency sampling.

6. The method according to claim 1, wherein the step of processing the sensory data includes processing sensory data that includes timestamped and synchronized sensory data.

7. The method according to claim 1, wherein the step of monitoring is performed by further using a temporally actual wake conditions; and
wherein the step of processing is performed by further calibrating processed sensory data against the temporally actual wake conditions.

8. The method of claim 7, wherein the temporally actual wake conditions are obtained by LiDAR measurements.

9. The method according to claim 1, wherein the accelerometers are three-axis accelerometers.

10. A method of optimizing operation of a wind farm with multiple wind turbine generators, including the following steps:
monitoring one or more wake conditions using sensory data from one or more sensors, wherein the one or more sensors are accelerometers arranged as vibration sensors placed in one or more blades of a respective rotor of the multiple wind turbine generators;
processing the sensory data using machine learning to identify one or more wake conditions;
establishing wake management of the wind farm as a function of the identified one or more wake conditions;
determining individual wind turbine generator control settings as an optimized power production function of the wake management and individual wind turbine generator parameters; and
operating one or more wind turbine generators in the wind farm using the individual wind turbine generator control setting.

11. The method according to claim 10, wherein the step of determining individual wind turbine generator control settings includes minimizing the total wake in the wake management as a function of the wake conditions.

12. The method according to claim 10, wherein the step of operating one or more wind turbine generators includes one or more of the following: pitching, yawing, regulating rotational speed of the one or more blades of a rotor.

13. A controller system for optimizing operation of a wind farm with multiple wind turbine generators, the controller system configured and arranged to:
receive sensory data from accelerometers arranged as vibration sensors placed in one or more of the blades of a rotor of the multiple wind turbine generators and using machine learning to process the sensory data to identify wake conditions;
establishing a wake management of the wind farm as a function of the wake conditions;
determining individual wind turbine generator control settings as an optimized power production function of the wake management and individual wind turbine generator parameters; and
operating one or more wind turbine generators in the wind farm using the individual wind turbine generator control settings.

14. The controller system according to claim 13, wherein the controller system is further configured and arranged to establish a wake field map from the sensory data, and a management strategy is defined and applied to the wind farm using the wake field map.

15. The controller system according to claim 13, wherein the controller system is further configured and arranged to determine GPS coordinates of the multiple wind turbine generators.

16. The controller system of claim 13, wherein the controller system is further configured and arranged to measure nacelle direction.

17. The controller system of claim 13, wherein the controller system is further configured and arranged to measure generator power output.

* * * * *